Aug. 2, 1932.  C. L. ROBERTS  1,869,778
APPARATUS FOR COUPLING PIPES
Filed Oct. 31, 1930  2 Sheets-Sheet 1
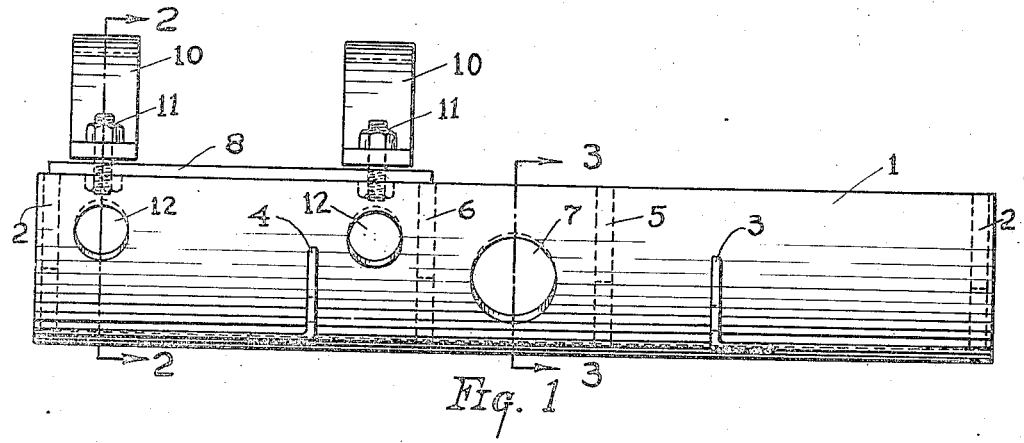
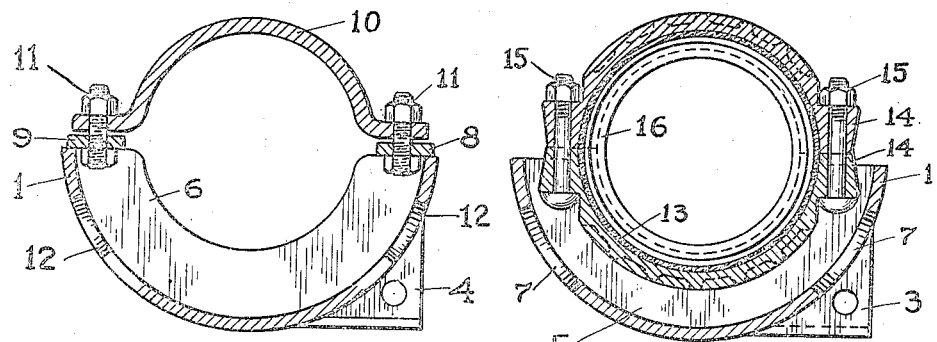 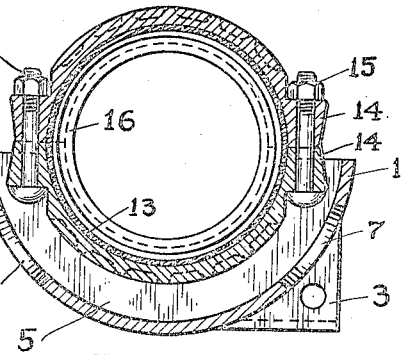
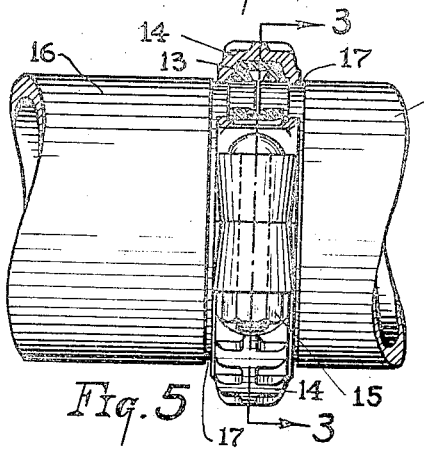 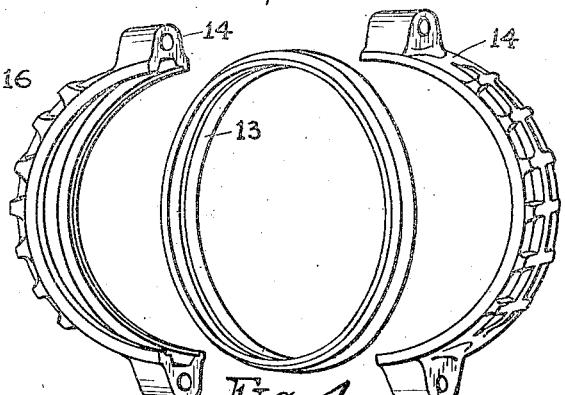
INVENTOR.
Charles L. Roberts
BY
Philip Subkin
ATTORNEYS.

Aug. 2, 1932.     C. L. ROBERTS     1,869,778
APPARATUS FOR COUPLING PIPES

Filed Oct. 31, 1930     2 Sheets-Sheet 2

INVENTOR.
Charles L. Roberts
BY
ATTORNEYS.

Patented Aug. 2, 1932

1,869,778

UNITED STATES PATENT OFFICE

CHARLES L. ROBERTS, OF RENO, NEVADA

APPARATUS FOR COUPLING PIPES

Application filed October 31, 1930. Serial No. 492,588.

This invention relates to a device to assist in the coupling of pipes under water and is particularly adapted to the construction of submarine pipe lines.

The conventional method of coupling pipes under water is by the so-called "stabbing" means. In this method one or two divers hold the section of pipes to be coupled in register with the pipe line and another diver does the coupling. This requires a number of men and, due to the surge of the ocean currents, the registration is extremely difficult.

The device of this invention is directed to coupling pipe lines under these circumstances so as to reduce the number of men necessary to do the coupling and to facilitate the assembling of the pipe.

The invention will be better understood by reference to the accompanying drawings, of which:

Fig. 1 is a side elevation of the device.

Fig. 2 is a section taken on the line 2—2 of Fig. 1.

Fig. 3 is a section taken on the line 3—3 of Fig. 1.

Fig. 4 is an isometric portion of one form of coupling.

Fig. 5 shows the coupling and a portion of the coupling cut away. It will be observed that the pipe section in Fig. 3 is taken on the line 3—3 of Fig. 5. Figs. 5, 6, 7 and 8 show various stages of the method of coupling used.

Figure 6:
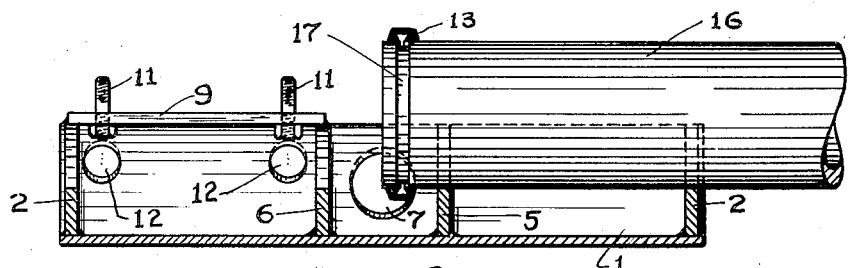
Figure 7:
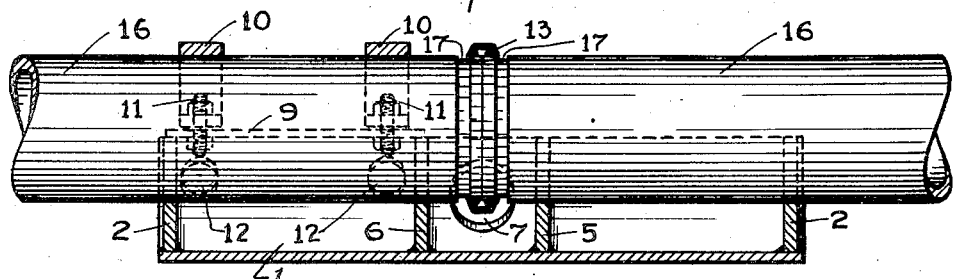
Figure 8:
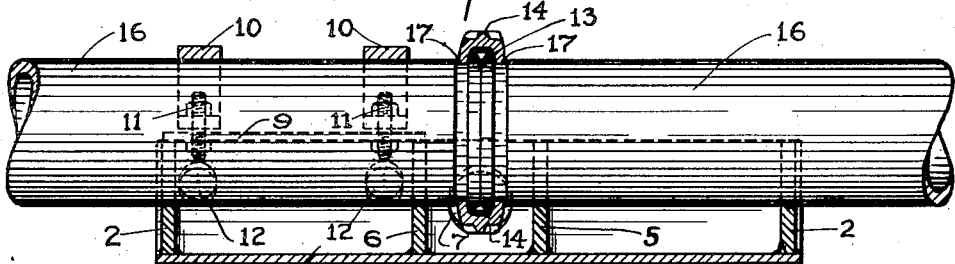
Figure 9:
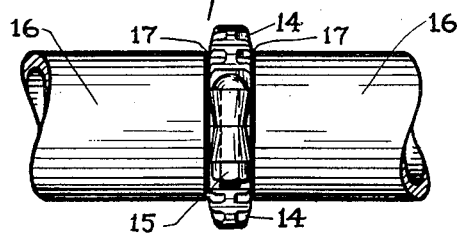

Fig. 9 shows the coupled device.

The device consists of semi-cylindrical cradle 1, having end plates 2, cut out to receive the pipe. Two lugs 3 and 4, provided with holes, are positioned on the outside of the cradle. In the intermediate portion of the cradle are two pipe supports 5 and 6; between supports 5 and 6 are hand holes 7 one on each side of the cradle. Positioned on and between the supports 2 and 6 are straps 8 and 9 to which are attached two straps 10, bolted to 8 and 9 by bolts 11. On the side of the cradle underneath the bolts 11 are hand holes 12.

In operating the device, the coupled portion of the pipe line 16 is lifted and the cradle 1 slid under it so that the groove 17 of pipe 16 is in registry with hand hole 7. The rubber gasket 13 is slipped under one end of the pipe. The straps 10 are removed by removing bolts 11. The pipe section 16 to be connected to the rest of the pipe line is placed on the pipe support 2 and 6, and the straps 10 are placed over the pipe and the bolts placed to hold the pipes 16 firmly on the cradle. It is important that the pipes be held sufficiently firm so that the swells will not move it out of registry and thus interfere with the easy setting of the coupling. The diver inserts a holding wrench through hand hold 12 and is thus enabled to screw the bolt 11 firmly to hold the strap 10. The pipes 16 are now in register and the gasket 13 is slipped over as in Fig. 7. The sections 14 of the pipe coupling (see Fig. 4) are then easily slid over the pipe by inserting the strap between the pipes and the cradle. The diver after adjusting the couplings inserts the bolt through hand hole 7 and through appropriate openings in lugs on the coupling 14 and screws the bolt 15 tightly to hold the pipe coupling rigidly on the pipe. This coupling is held firmly by virtue of the groove 17. The straps 10 are then removed by removing the bolts 11 and a hook is placed in the lugs 4 and the cradle is rotated around the pipe, water in the cradle running out through hand holes 12 and 7, so facilitating the rotation and the cradle is moved to the next station. In this manner the coupling is made readily and with a minimum of labor.

The above description is not to be taken as limiting my invention but merely descriptive and illustrative of the best manner of carrying out my invention. Many variations thereof will appear to those skilled in the art without departing from the scope of my invention.

I claim:

1. A device for coupling submarine pipe sections comprising a semi-cylindrical cradle, a plurality of pipe supports, clamps over certain of said supports and hand holes under said clamps.

2. A device for coupling submarine pipe sections comprising a semi-cylindrical cradle, pipe supports, clamps for holding pipe on said pipe supports, hand holes for said clamps, a second set of pipe supports adapted to register pipe on said second set of supports with the pipe on said first mentioned pipe supports and a hand hole in the cradle between said sets of pipe supports.

3. In a device of the character described, a cradle having a plurality of pipe supports spaced along said cradle; clamps for holding pipe on said pipe supports; a hand hole in said cradle intermediate certain of said pipe supports; a curved base for said cradle, said cradle being rotatable on said base to disengage said pipe from said cradle.

Signed at Los Angeles, in the county of Los Angeles and State of California, this 20th day of October, A. D. 1930.

CHARLES L. ROBERTS.